United States Patent
Suwa et al.

(10) Patent No.: US 10,876,620 B2
(45) Date of Patent: Dec. 29, 2020

(54) VACUUM DRIVEN HYDRAULIC BALANCE SYSTEM

(71) Applicant: GM Global Technology Operations LLC, Detroit, MI (US)

(72) Inventors: Yujiro Suwa, Commerce Township, MI (US); Robert Benson Parrish, White Lake, MI (US); James D. Hendrickson, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1344 days.

(21) Appl. No.: 15/055,131

(22) Filed: Feb. 26, 2016

(65) Prior Publication Data

US 2017/0248222 A1 Aug. 31, 2017

(51) Int. Cl.
*F16H 57/04* (2010.01)

(52) U.S. Cl.
CPC ....... *F16H 57/0426* (2013.01); *F16H 57/043* (2013.01); *F16H 57/0435* (2013.01); *F16H 57/0476* (2013.01); *B60Y 2306/03* (2013.01)

(58) Field of Classification Search
CPC ............... B60K 1/00; B60K 2001/001; B60Y 2306/03; F16H 57/0426; F16H 57/0427; F16H 57/0428; F16H 57/043; F16H 57/0434; F16H 57/0435; F16H 57/0436; F16H 57/0443; F16H 57/0476
USPC ............ 464/7, 179, 183; 184/6.12, 6.13, 26, 184/27.1, 31
See application file for complete search history.

(56) References Cited

U.S. PATENT DOCUMENTS

| | | | | |
|---|---|---|---|---|
| 2,926,755 A | * | 3/1960 | Kolbe | F16H 57/043 184/6.12 |
| 4,644,815 A | * | 2/1987 | Kawano | F16H 3/089 184/6.12 |
| 5,107,676 A | * | 4/1992 | Hadaway | F16H 57/0434 184/6.11 |
| 5,341,901 A | * | 8/1994 | Mueller | F16H 57/043 184/27.1 |
| 5,713,670 A | * | 2/1998 | Goldowsky | F16C 33/107 384/115 |
| 7,694,780 B2 | * | 4/2010 | Beels van Heemstede | F16H 57/0434 184/6.12 |
| 8,069,661 B2 | * | 12/2011 | Hendrickson | F16H 61/0021 60/417 |
| 8,375,710 B2 | * | 2/2013 | Mellet | F16H 61/0021 60/329 |
| 8,671,793 B2 | * | 3/2014 | Kirchner | F16H 57/043 184/6.12 |

* cited by examiner

*Primary Examiner* — Josh Skroupa

(57) ABSTRACT

A motor vehicle vacuum driven hydraulic balance system includes a housing. A shaft rotatably supported in the housing has a longitudinal bore to deliver oil flow to a plurality of ports created in the shaft. A vacuum flow passage communicates with both the longitudinal bore and an oil sump. A first delivery passage is created in a portion of the housing, the first delivery passage in direct communication with the longitudinal bore. An electrical oil pump pumps oil from the oil sump to the longitudinal bore through the first delivery passage. Axial rotation of the shaft creates a partial vacuum in the longitudinal bore acting to vacuum drag oil from the oil sump through the vacuum flow passage to the longitudinal bore in addition to a volume of the oil delivered to the longitudinal bore by the electrical oil pump.

16 Claims, 4 Drawing Sheets

VACUUM DRIVEN HYDRAULIC BALANCE SYSTEM

FIELD

The present disclosure relates to rotating shaft lubrication systems in hybrid and electric motor operated automobile transmissions.

BACKGROUND

The statements in this section merely provide background information related to the present disclosure and may or may not constitute prior art.

Typical gasoline or diesel fueled engines and associated transmissions include a transmission shaft that can axially rotate at speeds up to approximately 6,000 rpm to 7,000 rpm. Power to provide oil lubrication at all operating speeds to components of such transmissions can be provided by a pump driven by the engine output shaft or supplemented by an electric pump, for which electrical power is available. Lubrication and transmission control oil is typically transferred via a central bore extending through the one or more transmission shafts through bores created in the shaft to the various transmission components, bearings, and bushings.

In contrast, because electric motor output power is typically lower compared to gasoline or diesel fueled engines, rotational shaft speeds are commonly increased. Electric motor operated and hybrid vehicle transmission shafts can axially rotate at significantly higher speeds, which can exceed 15,000 rpm. As the transmission shaft spins faster, the hydraulic system is required to deliver higher oil flow rates.

Power to provide oil lubrication at all operating speeds to components of known electric motor operated and hybrid vehicle transmissions is commonly provided by electric motor operated lubrication pumps, which typically provide varying flow rates at different operating speeds. Oil management is therefore difficult to optimize throughout all of the different driving cycles and conditions of electric motor operated and hybrid vehicle transmissions. In addition, at the shaft rotational speeds of electric motor operated and hybrid vehicle transmissions, the power required to deliver oil flow and pressure via an electric pump can require an electric motor of undesirable wattage, size, and cost.

Thus, there is a need for a new and improved transmission lubrication system that provides lubrication oil at all operating speeds and conditions.

SUMMARY

According to several aspects, a motor vehicle vacuum driven hydraulic balance system includes a housing. A shaft rotatably supported in the housing has a longitudinal bore acting to deliver an oil flow to a plurality of ports created in the shaft. A vacuum flow passage communicates with both the longitudinal bore and an oil sump. Axial rotation of the shaft creates a partial vacuum in the longitudinal bore acting to vacuum drag oil from the oil sump through the vacuum flow passage to the longitudinal bore.

In an additional aspect of the present disclosure, the vacuum flow passage extends through a member of the housing.

In another aspect of the present disclosure, the member is an integral portion of the housing.

In another aspect of the present disclosure, the housing and the member define a casting.

In another aspect of the present disclosure, a first delivery passage is created in a portion of the housing, the first delivery passage in direct communication with the longitudinal bore; and an electrical oil pump acts to pump oil from the oil sump to the first delivery passage.

In another aspect of the present disclosure, a second delivery passage is created in the portion of the housing, the second delivery passage is in communication with the vacuum flow passage between the vacuum flow passage and the oil sump.

In another aspect of the present disclosure, a sleeve has a first sleeve portion fixed in the second delivery passage and a second sleeve portion extending outward from the second delivery passage into the longitudinal bore at a shaft end of the shaft.

In another aspect of the present disclosure, the second sleeve portion has a diameter smaller than a diameter of the longitudinal bore in the shaft end thereby defining a restricted passageway between an inner wall of the shaft end and an outer wall of the sleeve.

In another aspect of the present disclosure, the first delivery passage directly opens into a cavity created in the portion of the housing.

In another aspect of the present disclosure, a rotational seal is positioned between an exterior facing cavity wall of the cavity and an exterior face of a shaft end of the shaft, the shaft end extending past the seal to end in the cavity.

In another aspect of the present disclosure, the seal is positioned between the shaft end and a first one of the plurality of ports created in the shaft.

In another aspect of the present disclosure, the second sleeve portion includes a tapered wall at a free end, whereby oil flowing through the restricted passageway between the inner wall of the shaft end and the outer wall of the sleeve passes over the tapered wall and creates a low pressure zone at an open end of the sleeve.

In another aspect of the present disclosure, the shaft is connected to and axially rotated by an electrical motor.

In another aspect of the present disclosure, a check valve is positioned in the vacuum flow passage.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
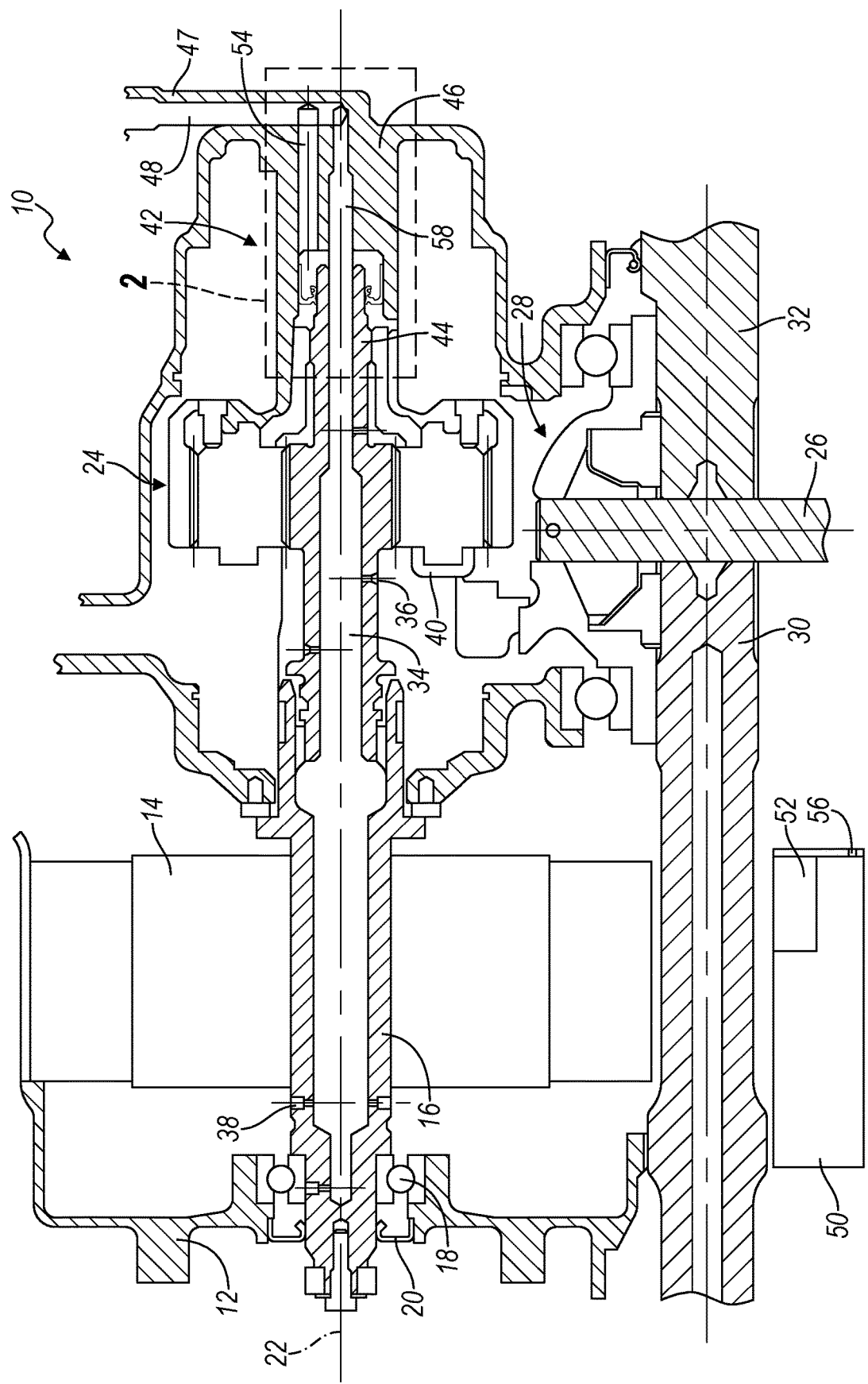
FIG. 1 is a cross sectional side elevational view of a transmission having vacuum driven hydraulic balance system of the present disclosure.

Referring to FIG. 1, a motor vehicle vacuum driven hydraulic balance system 10 includes a housing 12 which is typically cast from a metal such as aluminum to allow for complex interior and exterior features. An electrical motor 14 is positioned in the housing 12 which is fixed to an axial shaft 16. Operation of the electrical motor 14 axially rotates the shaft 16. The shaft 16 is rotatably supported to structure of the housing 12 for example using a bearing 18 such as a rotary bearing or bush. At least one rotary seal 20 is also provided to seal the shaft 16 at a boundary with the housing 12. The electrical motor 14 and the shaft 16 axially co-rotate with respect to a longitudinal central axis 22 of the shaft 16.

The shaft 16 is connected to and rotates components of a planetary gear set 24. The planetary gear set 24 is connected to and rotates a shaft 26 which via a differential gear assembly 28 rotates axle half shafts 30, 32 to provide propulsion power to the vehicle wheels (not shown). In order to provide lubrication and cooling oil to components positioned in the housing 12 of the vacuum driven hydraulic balance system 10 including the planetary gear set 24 and the bearing 18, the shaft 16 is provided with a central bore 34 co-axially aligned with the longitudinal central axis 22. At least one, and according to several aspects multiple ports are created through the wall of the shaft 16, oriented perpendicular to the longitudinal central axis 22. Examples of such ports include a first port 36 positioned proximate to the planetary gear set 24, and a second port 38 positioned proximate to the bearing 18. According to several aspects, a carrier 40 of the planetary gear set 24 is connected to and therefore drives the differential 28.

To provide lubrication oil to the central bore 34 the vacuum driven hydraulic balance system 10 includes an oil delivery section 42 positioned proximate to a shaft end 44. The shaft end 44 is rotatably supported in a housing cover 46. The housing cover 46 also provides multiple chambers such as a first housing member 47, which provides a first oil delivery passage 48. Lubrication oil is collected in the housing 12 in an oil sump 50. An electric oil pump 52 is energized to draw oil from the oil sump 50 and deliver pressurized oil through the first oil delivery passage 48 to the central bore 34 via a first delivery passage 54 created in the oil delivery section 42. According to several aspects, the electric oil pump 52 is positioned directly within the oil sump 50. According to further embodiments (not shown) the electric oil pump 52 is positioned remotely from the oil sump 50.

Pressurized oil discharged from operation of the electric oil pump 52 is directed via internal passageways created in the housing cover 46 such as through the first oil delivery passage 48 extending through the first housing member 47 to the central bore 34. A vacuum draw port 56 is also provided in the cover of the oil sump 50. At higher rotational speeds of the shaft 16, the vacuum draw port 56 allows a portion of the oil in the oil sump to bypass the electric oil pump 52 and be delivered through a second delivery passage 58 created in the oil delivery section 42 via pathways which will be described in greater detail in reference to FIGS. 2 and 3.

Referring to FIG. 2 and again to FIG. 1, the first delivery passage 54 directly opens into a cavity 60 created in the housing cover 46. A rotational seal 62 is positioned between an exterior facing cavity wall 64 and an exterior face 66 of a shaft end 68 of the shaft 16, which therefore extends past the seal 62 to end in the cavity 60. The second delivery passage 58 does not directly open into the cavity 60. A sleeve 70 is disposed partially into an enlarged diameter end portion 72 of the second delivery passage 58 such that a first sleeve section 74 is press fit against an inner wall 76 of the enlarged diameter end portion 74. A second sleeve section 78 extends outwardly of the second delivery passage 58 and partially into the central bore 34 created in the shaft end 68. An inner diameter "A" of the shaft end 68 is greater than an outer diameter "B" of the sleeve 70 such that a diametrical clearance "C" for a cylindrical shaped restricted passageway 80 is defined between an inner wall 82 of the shaft end 68 and an outer wall 84 of the sleeve 70.

A free end 86 of the sleeve 70 is positioned within the central bore 34 within the shaft end 68, but stopping before a port 88 located proximate to the rotary seal 62 outside of the cavity 60. Oil delivered to the cavity 60 via the first delivery passage 54 is therefore directed through the restricted passageway 80 before being delivered to the ports created in the shaft 34, including the port 88. A tapered wall 90 is provided at the free end 86 of the sleeve 70, which will be described in greater detail in reference to FIG. 3.

Figure 2:
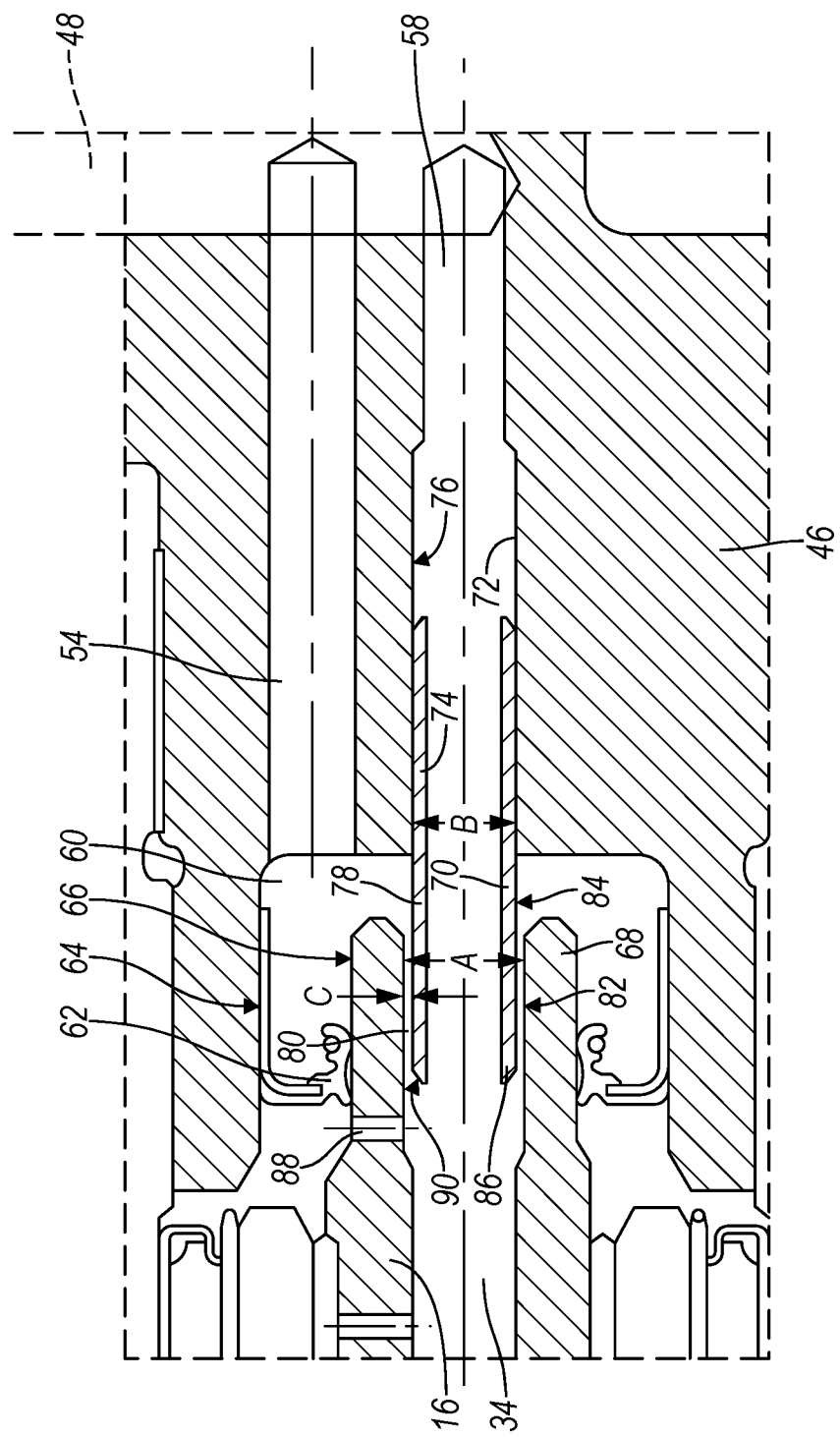
FIG. 2 is a cross sectional side elevational view of area 2 of FIG. 1.

Referring to FIG. 3 and again to FIGS. 1 through 2, the shaft 16 axially rotates while the sleeve 70 is fixed to the housing cover 46 and therefore is non-rotatable. Pressurized oil passing through the first delivery passage 54 is substantially at a static pressure, and at a low velocity in the comparatively large flow area of the first delivery passage 54. As the oil enters the cavity 60 it is redirected in the direction of flow arrow "D" toward the passageway 80. Oil flow entering the restricted passageway 80 substantially enters a contraction zone having a reduced flow area and a significantly higher velocity compared to the oil flow in the first delivery passage 54. Due to Bernoulli's Law, as the velocity and pressure increase in the restricted passageway 80, the oil pressure is reduced. As the higher pressure, high velocity oil flow subsequently exits the restricted passageway 80 in a direction of flow arrow "E" at the free end 86 of the sleeve 70 it expands rapidly into the larger diameter of the central bore 34. This expansion is aided by the geometry of the tapered wall 90, which helps transition the oil discharge. Rapid expansion of the pressurized oil creates a "vena contracta" low pressure zone 92 at the open end of the sleeve 70.

Figure 3:
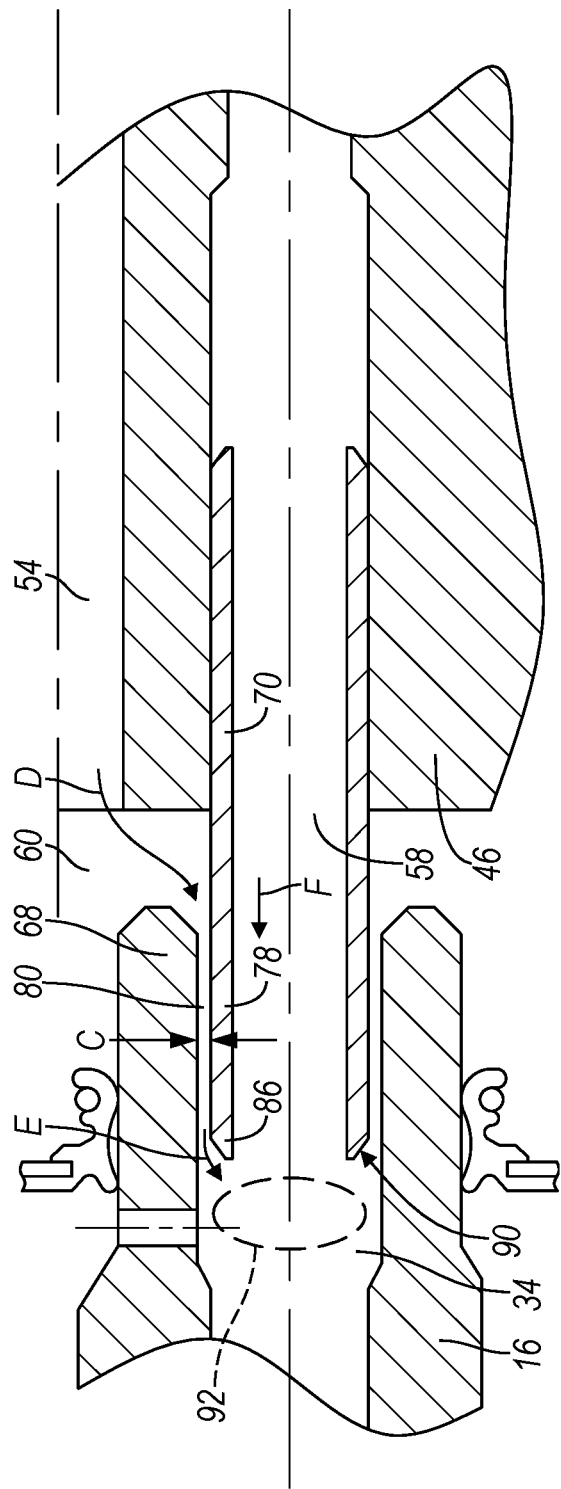
FIG. 3 is a further expanded view of the cross sectional side elevational view of area 2 of FIG. 1.

At elevated rotational speeds of the shaft 16, for example at speeds of approximately 4000 rpm and above, a partial vacuum is created in the central bore 34. The low pressure zone 92, together with the partial vacuum created by the velocity of rotation of the shaft 16 induces a partial vacuum draw of oil into the second delivery passage 58 in a flow direction "F". With continuing reference to FIGS. 1 and 3, by providing an internal flow passage through the housing cover 46 connected to the vacuum draw port 56 of the oil sump 50, additional oil flow, above the volume being displaced by operation of the electrical pump 52, is vacuum drawn out of the oil sump 50 and discharged via the second delivery passage 58 into the central bore 34. This vacuum drawn flow of oil supplements the oil flow rate delivered by the electrical pump, and increases with increasing speed of rotation of the shaft 16. It is anticipated that approximately 10 in to 12 in vacuum will be created in the second delivery passage 58 at a shaft 16 rotational speed of approximately 16,000 rpm, which will add approximately 3.2 to 3.4 L/min of oil flow to that delivered by the electrical pump 50.

Figure 4:
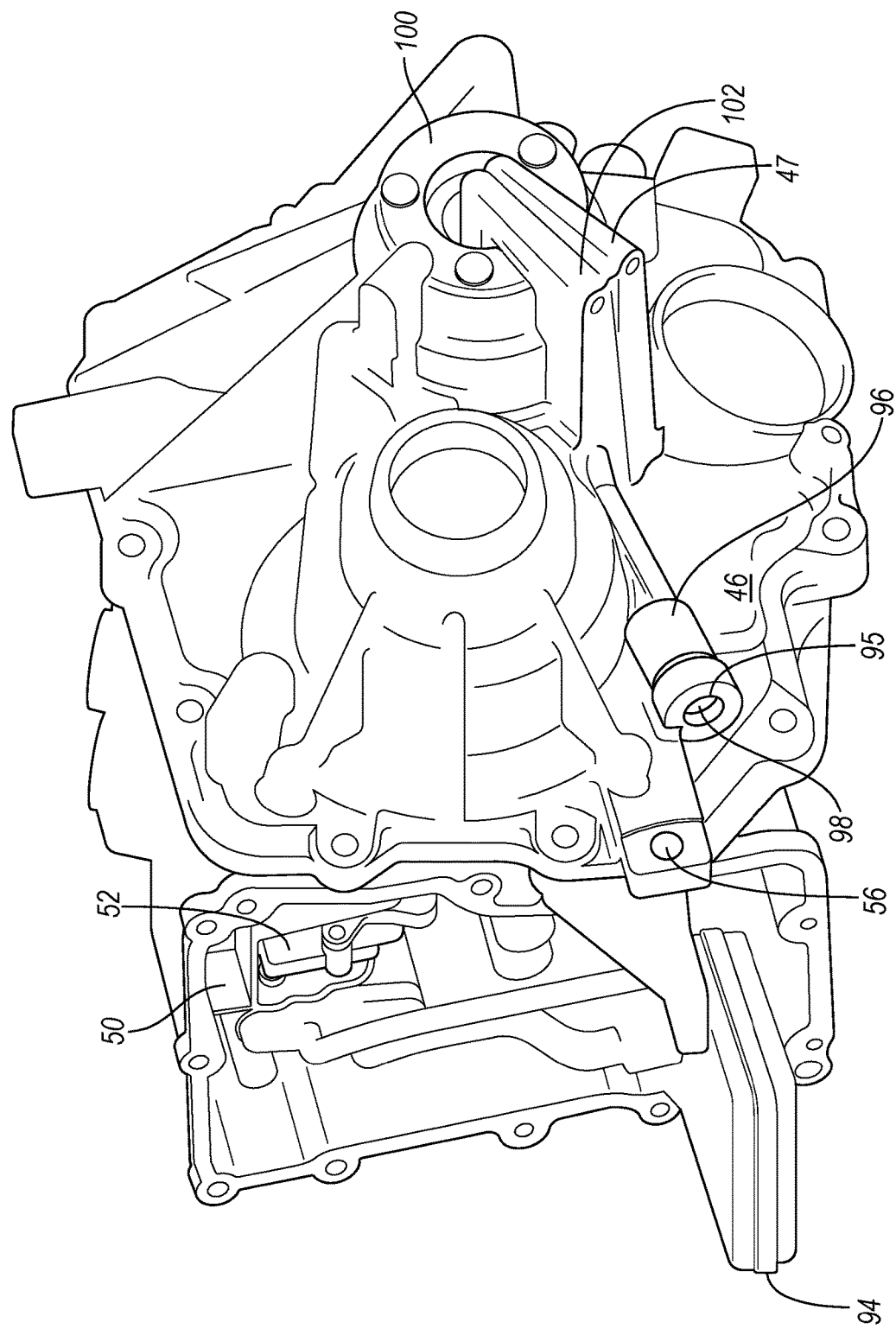
FIG. 4 is an end elevational view of the transmission of FIG. 1.

Referring to FIG. 4 and again to FIGS. 1 through 3, with a portion of the housing 12 removed for clarity, the oil sump 50 may include a filter or strainer 94 connected to a suction side of the electrical pump 52. As previously noted, the first housing member 47 provides a communication path for oil delivered by the electrical pump 50 to the first delivery passage 54. The vacuum draw port 56 communicates via a vacuum flow passage 95 (only partially visible in this view with a portion of the housing 12 removed) created through a second housing member 96. To prevent backflow of oil returning to the oil sump 50 from the vacuum flow passage 95 extending through the second housing member 96 and the second delivery passage 58 a check valve 98 can be positioned within one of the vacuum flow passage 95 of the second housing member 96, within the oil sump 50 proximate to the vacuum draw port 56, or in the second delivery passage 58. The vacuum flow passage 95 extending through the second housing member 96 internally communicates with and extends through a third housing member 102 to communicate with the second delivery passage 58. According to several aspects, the first housing member 47, the second housing member 96, and the third housing member 47 may be integrally provided with the casting defining the housing cover 46.

According to several aspects of the present disclosure, a motor vehicle vacuum driven hydraulic balance system 10 includes a housing 12. A shaft 16 is rotatably supported in the housing 12, the shaft 16 having a longitudinal bore 34 acting to deliver an oil flow to a plurality of ports 36, 38 created in the shaft 16. A vacuum flow passage 95 communicates with both the longitudinal bore 34 and an oil sump 50. A first delivery passage 54 is created in a portion of the housing 12, the first delivery passage 54 in direct communication with the longitudinal bore 34. An electrical oil pump 52 acts to pump oil from the oil sump 50 to the longitudinal bore 34 through the first delivery passage 54. Axial rotation of the shaft 16 creates a partial vacuum in the longitudinal bore 34 acting to vacuum drag oil from the oil sump 50 through the vacuum flow passage 95 to the longitudinal bore 34 in addition to a volume of the oil delivered to the longitudinal bore 34 by the electrical oil pump 52.

A motor vehicle vacuum driven hydraulic balance system 10 of the present disclosure offers several advantages. By providing a vacuum draw port in the oil sump, the vacuum produced by a rapidly rotating shaft of a transmission can be used to draw an additional volume of oil to the shaft central bore. By providing the sleeve and cavity configuration of the present system, a pressure drop occurring at the point of discharge of pressurized oil from the operating electrical oil pump can be utilized to enhance the vacuum draw of oil from the oil sump. The vacuum draw increases with increasing shaft rotational speed, and is particularly advantageous at shaft rotational speeds ranging between approximately 4,000 rpm to approximately 16,000 rpm or higher. The wattage and size of an electrical oil pump can therefore be reduced compared to a system not providing the present vacuum draw capability and relying solely on the output of an electrical oil pump.

The description of the invention is merely exemplary in nature and variations that do not depart from the gist of the invention are intended to be within the scope of the invention. Such variations are not to be regarded as a departure from the spirit and scope of the invention.

What is claimed is:

1. A motor vehicle vacuum driven hydraulic balance system, comprising:
    a housing;
    a shaft rotatably supported in the housing, the shaft having a longitudinal bore acting to deliver an oil flow to a plurality of ports created in the shaft;
    a vacuum flow passage communicating with both the longitudinal bore and an oil sump;
    a first delivery passage created in a portion of the housing, the first delivery passage in direct communication with the longitudinal bore;
    an electrical oil pump acting to pump oil from the oil sump to the first delivery passage;
    a second delivery passage created in the portion of the housing, the second delivery passage in communication with the vacuum flow passage between the vacuum flow passage and the oil sump; and
    a sleeve having a first sleeve portion fixed in the second delivery passage and a second sleeve portion extending outward from the second delivery passage into the longitudinal bore at a shaft end of the shaft;
    wherein axial rotation of the shaft creates a partial vacuum in the longitudinal bore acting to vacuum drag oil from the oil sump through the vacuum flow passage to the longitudinal bore.

2. The motor vehicle vacuum driven hydraulic balance system of claim 1, wherein the vacuum flow passage extends through a member of the housing.

3. The motor vehicle vacuum driven hydraulic balance system of claim 2, wherein the member is an integral portion of the housing.

4. The motor vehicle vacuum driven hydraulic balance system of claim 2, wherein the housing and the member define a casting.

5. The motor vehicle vacuum driven hydraulic balance system of claim 1, wherein the second sleeve portion has a diameter smaller than a diameter of the longitudinal bore in the shaft end thereby defining a restricted passageway between an inner wall of the shaft end and an outer wall of the sleeve.

6. The motor vehicle vacuum driven hydraulic balance system of claim 5, wherein the second sleeve portion includes a tapered wall at a free end, whereby oil flowing through the restricted passageway between the inner wall of the shaft end and the outer wall of the sleeve passes over the tapered wall and creates a low pressure zone at an open end of the sleeve.

7. The motor vehicle vacuum driven hydraulic balance system of claim 1, wherein the first delivery passage directly opens into a cavity created in the portion of the housing.

8. The motor vehicle vacuum driven hydraulic balance system of claim 7, further including a rotational seal positioned between an exterior facing cavity wall of the cavity and an exterior face of a shaft end of the shaft, the shaft end extending past the seal to end in the cavity.

9. The motor vehicle vacuum driven hydraulic balance system of claim 8, wherein the seal is positioned between the shaft end and a first one of the plurality of ports created in the shaft.

10. The motor vehicle vacuum driven hydraulic balance system of claim 1, wherein the shaft is connected to and axially rotated by an electrical motor.

11. The motor vehicle vacuum driven hydraulic balance system of claim 1, further including a check valve positioned in the vacuum flow passage.

12. A motor vehicle vacuum driven hydraulic balance system, comprising:
    a housing;
    a shaft rotatably supported in the housing, the shaft having a longitudinal bore acting to deliver an oil flow to a plurality of ports created in the shaft;
    a vacuum flow passage communicating with both the longitudinal bore and an oil sump;

a first delivery passage created in a portion of the housing, the first delivery passage in direct communication with the longitudinal bore;

an electrical oil pump acting to pump oil from the oil sump to the longitudinal bore through the first delivery passage;

a second delivery passage created in the portion of the housing, the second delivery passage in communication with the vacuum flow passage between the vacuum flow passage and the oil sump; and a sleeve having a first sleeve portion fixed in the second delivery passage and a second sleeve portion extending outward from the second delivery passage into the longitudinal bore at a shaft end of the shaft;

wherein axial rotation of the shaft creates a partial vacuum in the longitudinal bore acting to vacuum drag oil from the oil sump through the vacuum flow passage to the longitudinal bore in addition to a volume of the oil delivered to the longitudinal bore by the electrical oil pump.

13. The motor vehicle vacuum driven hydraulic balance system of claim 12, wherein the vacuum flow passage extends through a member of the housing defining an integral portion of the housing.

14. The motor vehicle vacuum driven hydraulic balance system of claim 13, further including a check valve positioned in the vacuum flow passage between a vacuum draw port created in the oil sump and the longitudinal bore.

15. The motor vehicle vacuum driven hydraulic balance system of claim 12, wherein the second sleeve portion includes a tapered wall at a free end, whereby oil flowing through a restricted passageway between an inner wall of the shaft end and an outer wall of the sleeve passes over the tapered wall and creates a low pressure zone at an open end of the sleeve.

16. A motor vehicle vacuum driven hydraulic balance system, comprising:

a housing;

a shaft rotatably supported in the housing, the shaft having a longitudinal bore acting to deliver an oil flow to a plurality of ports created in the shaft;

a vacuum flow passage communicating with both the longitudinal bore and an oil sump;

a first delivery passage created in a portion of the housing, the first delivery passage in direct communication with the longitudinal bore;

an electrical oil pump acting to pump oil from the oil sump to the longitudinal bore through the first delivery passage;

a second delivery passage created in the portion of the housing, the second delivery passage in communication with the vacuum flow passage between the vacuum flow passage and the oil sump; and a sleeve having a first sleeve portion fixed in the second delivery passage and a second sleeve portion extending outward from the second delivery passage into the longitudinal bore at a shaft end of the shaft;

wherein axial rotation of the shaft creates a partial vacuum in the longitudinal bore acting to vacuum drag oil from the oil sump through the vacuum flow passage to the longitudinal bore in addition to a volume of the oil delivered to the longitudinal bore by the electrical oil pump.

* * * * *